United States Patent
Bauer et al.

(10) Patent No.: US 7,219,776 B2
(45) Date of Patent: May 22, 2007

(54) FRICTION DISC AND PROCESS FOR PRODUCING THE SAME

(75) Inventors: Moritz Bauer, Augsburg (DE); Bodo Benitsch, Buttenwiesen (DE); Martin Christ, Wehringen (DE); Udo Gruber, Neusäss (DE); Michael Heine, Allmannshofen (DE); Andreas Kienzle, Thierhaupten (DE); Jens Rosenlöcher, Augsburg (DE); Rainer Zimmermann-Chopin, Ellgau (DE)

(73) Assignee: Audi AG, Ingolstadt (DE)

( * ) Notice: Subject to any disclaimer, the term of this patent is extended or adjusted under 35 U.S.C. 154(b) by 759 days.

(21) Appl. No.: 10/125,083

(22) Filed: Apr. 18, 2002

(65) Prior Publication Data

US 2002/0153214 A1    Oct. 24, 2002

(30) Foreign Application Priority Data

Apr. 18, 2001    (DE)    ................. 101 18 920

(51) Int. Cl.
*F16D 66/00*    (2006.01)
(52) U.S. Cl. ............ 188/218 XL; 188/1.11 W; 192/107 M
(58) Field of Classification Search ............ 188/1.11 R, 188/1.11 W, 218 XL, 79.51, 79.52, 264 R; 116/208, 231; 192/107 M
See application file for complete search history.

(56) References Cited

U.S. PATENT DOCUMENTS

| | | | | |
|---|---|---|---|---|
| 3,956,548 A | * | 5/1976 | Kovac et al. ............... 428/66.2 |
| 4,298,857 A | | 11/1981 | Robins et al. |
| 4,604,604 A | * | 8/1986 | Mann ........................ 340/454 |
| 4,907,677 A | * | 3/1990 | Yamashita et al. ......... 188/73.1 |
| 5,613,578 A | * | 3/1997 | Moseley et al. ...... 188/218 XL |
| 6,030,913 A | | 2/2000 | Heine et al. |
| 6,042,935 A | | 3/2000 | Krenkel et al. |
| 6,086,814 A | | 7/2000 | Krenkel et al. |
| 6,193,027 B1 | * | 2/2001 | Krenkel et al. ....... 188/218 XL |
| 6,231,791 B1 | | 5/2001 | Heine et al. |
| 6,457,566 B1 | * | 10/2002 | Toby .................... 188/1.11 W |
| 6,531,011 B2 | * | 3/2003 | Gross et al. ............. 156/89.25 |
| 2002/0144866 A1 | * | 10/2002 | Martin ................. 188/1.11 W |

FOREIGN PATENT DOCUMENTS

| | | |
|---|---|---|
| DE | 44 38 455 C1 | 5/1996 |
| DE | 44 38 456 A1 | 5/1996 |
| DE | 195 38 144 A1 | 4/1997 |
| DE | 196 51 798 A1 | 6/1998 |
| DE | 197 10 105 A1 | 9/1998 |
| DE | 101 16 659 | * 12/2002 |
| EP | 0 985 845 A1 | 3/2000 |
| GB | 2 306 225 A | 4/1997 |

* cited by examiner

Primary Examiner—Bradley King
(74) Attorney, Agent, or Firm—Laurence A. Greenberg; Werner H. Stemer; Ralph E. Locher

(57) ABSTRACT

A friction disc, in particular a brake or clutch disc, includes carbon fiber-reinforced ceramic composite material with at least one top surface formed as a friction surface. At least part of the friction surface is formed of a different material, in particular of a carbon-containing material. The different material exhibits lower wear and oxidation resistance than that of the rest of the friction surface and a supporting zone of the friction disc. A visual, audible or mechanical signal is produced under operating conditions due to comparatively greater wear. The signal provides a warning that the service life of the friction disc is being exceeded. A process for producing the friction disc is also provided.

18 Claims, 1 Drawing Sheet

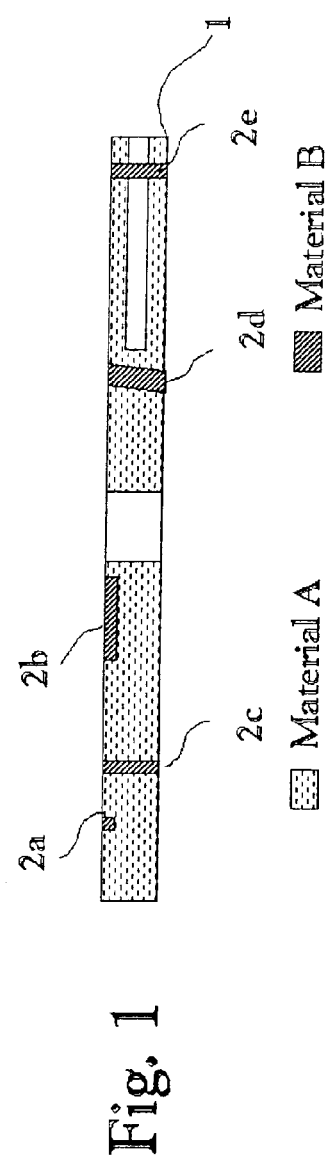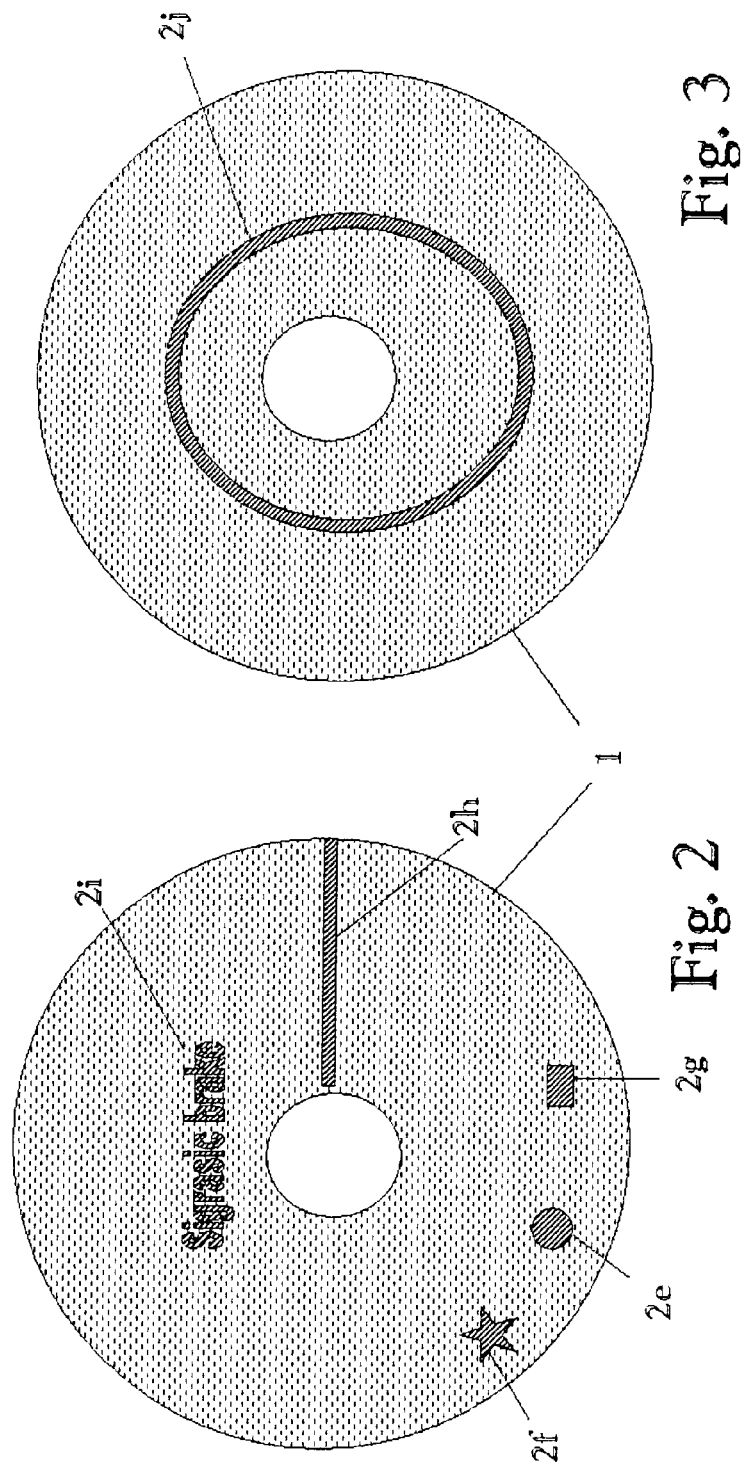

FRICTION DISC AND PROCESS FOR PRODUCING THE SAME

BACKGROUND OF THE INVENTION

Field of the Invention

The invention relates to a friction disc, in particular a brake or clutch disc, made from carbon fiber-reinforced ceramic composite material with at least one top surface formed as a friction surface. The invention also relates to a process for producing the friction disc.

The use of composite materials in friction discs for brake applications is known from the air travel and auto racing sectors. Such materials offer the advantage of good tribological characteristics up to the highest loads and temperatures. Materials which have proven themselves technically are those formed of carbon fiber-reinforced carbon (CFC) materials. Fiber-reinforced ceramics with matrices based, in particular, on silicon, silicon carbide and carbon or mixtures thereof with matrix materials are used in the newest generation of materials for friction and brake discs. The widespread use of carbon or graphite fibers in conjunction with matrix materials including mixtures of silicon carbide, silicon and carbon results in "C/SiC materials", which are described, for example, in German Published, Non-Prosecuted Patent Application DE 197 10 105 A1, corresponding to U.S. Pat. Nos. 6,030,913 and 6,231,791 B1. Friction discs, and in particular brake discs, generally include two zones of different material characteristics and composition, which are determined by different specifications placed upon them. A suitable structure for C/SiC materials is described, for example, in German Published, Non-Prosecuted Patent Application DE 44 38 456 A1, corresponding to U.S. Pat. No. 6,042,935. An upper zone, exposed to wear, is the "friction surface", which is distinguished by particular friction and wear characteristics. A material therebelow forms a supporting zone, the purpose of which is substantially to absorb frictional forces and transmit them to the mounting of the friction disc, as well as to absorb and dissipate the friction or braking energy. Although C/SiC materials are distinguished by resistance to high temperatures of over 1000° C. and by high wear resistance, over long-term use under such application conditions, oxidative wear (chemical modification of the surface and/or the underlying layers) and tribological wear (abrasion) may occur.

It is common to both CFC and C/SiC materials that they contain carbon in fiber form and/or in the matrix, with the latter being exposed to appreciable oxidation at temperatures arising during long-term use under application conditions. Burning-off of the carbon weakens the structure and reduces strength.

The mechanical properties of the composite material become more ceramic-like, a phenomenon which is characterized in particular by a reduction in fracture toughness. That weakening is very disadvantageous, particularly for the functioning of the supporting zone, since failure of the material in the area of the brake or friction disc mountings may lead to total failure of the structure. That is all the more significant since the typical failure pattern of ceramic materials under excessive mechanical stress is that of brittle fracture behavior. Thus, plastic flow and deformation no longer occur under excessive stress, but rather there is catastrophic breakage, for-example of metallic materials, such as cast iron brake discs.

The abrasive wear of brake systems is generally measured by attaching electronic sensors to the friction linings opposing friction rings, as is described, for example, in U.S. Pat. No. 4,298,857. Electrical contacts which come away as a result of material abrasion, are incorporated into the friction surface in that case. A disadvantage of that process is that such sensors cannot be incorporated into the friction disc itself at economically justifiable cost. Indeed, it is not even really possible to provide electronic and electrical systems in the friction discs, given the application temperatures arising in the friction discs, which may amount to over 1000° C. Another method of indicating abrasive wear of the friction surface is to provide indentations in the friction surface, which are eradicated by material abrasion of the entire friction surface during the course of use, as is described, for example, in European Patent Application EP 0 985 845 A1. However, both systems only indicate wear of the friction zone, and not the state of oxidative wear of the supporting zone and are thus incapable of indicating the mechanical characteristics of the stressed system.

SUMMARY OF THE INVENTION

It is accordingly an object of the invention to provide a friction disc and a process for producing the same, which overcome the hereinafore-mentioned disadvantages of the heretofore-known products and processes of this general type, in which the friction disc has at least one element that is in a position to visually indicate to a user, audibly or in some other way, a state of wear of the friction disc, before weakening and impairment of a function of a supporting zone occurs, in particular due to oxidative wear.

With the foregoing and other objects in view there is provided, in accordance with the invention, a friction disc, in particular a brake or clutch disc, comprising at least one top surface formed as a friction surface and a supporting zone. A ceramic composite material A reinforced with carbon fibers (also known as C fibers) is provided as well as a material B, in particular a carbon-containing material, being different than the material A and exhibiting lower wear and oxidation resistance than the material A. At least a part of the friction surface (a surface element) being elements with a given mass is formed of the material B, and a remainder of the friction surface and the supporting zone is formed of the material A. A balance quality is impaired by at least 5% due to a friction disc imbalance caused by a loss of 50% of the given mass.

In accordance with another feature of the invention, the matrix material of the material A is preferably a mixture of silicon carbide, silicon and carbon.

With the objects of the invention in view, there is also provided a friction disc, in particular a brake or clutch disc, comprising at least one top surface formed as a friction surface and a supporting zone. A carbon fiber-reinforced ceramic composite material A is provided as well as a material B, in particular a carbon-containing material, being different than the material A and exhibiting lower wear and oxidation resistance than the material A. Between more than 0.1% and 20% of the friction surface is formed of the material B, and a remainder of the friction surface and the supporting zone is formed of the material A.

With the foregoing and other objects in view there is additionally provided, in accordance with the invention, a friction disc, in particular a brake or clutch disc, comprising at least one top surface formed as a friction surface and a supporting zone. A carbon fiber-reinforced ceramic composite material A is provided as well as a material B, in particular a carbon-containing material, being different than the material A and exhibiting lower wear and oxidation resistance than the material A. At least a part of the friction surface is elements formed of the material B, and a remainder of the friction surface and the supporting zone is formed of the material A. The elements formed of the material B have a thickness of less than 100% of the thickness of the friction disc.

The difference in the resistances between the material B of the surface element and the material A of the friction disc and/or supporting zone is selected in such a way that the wear in the area of the surface element acting as a sensor becomes visually, audibly or otherwise noticeable to the operator during operation, before the rest of the friction disc itself, including the supporting zone, clearly indicates recognizable wear. In accordance with a further feature of the invention, the surface elements made from the lower resistance material B are preferably disposed symmetrically relative to the axis of rotation to avoid imbalance in the unworn state, with at least two such surface elements being incorporated into the friction disc. The surface elements may be polygonal, star-shaped, elliptical or preferably circular.

Thus, surface elements or planar sensors, that are also referred to below merely as "sensors" for the sake of simplicity, which are subject to faster progressing oxidative wear than the rest of the friction surface of the disc, are let into the friction surface or are let in at other suitable locations on the friction disc. The wear to the planar sensors is made visually, audibly or mechanically apparent. The friction disc may then be exchanged or re-machined, before it displays clearly recognizable wear or oxidative damage for its part i.e. in particular the supporting zone. The planar sensors preferably are formed of carbon-containing and/or graphitic materials, which have lower oxidation resistance than the friction surface and the supporting zone. The heating of the friction disc caused by the braking process results in a gradual oxidative attack of the oxidation-sensitive materials, in particular the carbon structures (carbon fibers and carbon particles or areas in the matrix). This causes the planar sensors to disintegrate superficially and to assume a rough, porous or perforated appearance. This change in the consistency and/or surface morphology may be established, for example, by a simple visual inspection. If the sensors are attached to the inner surfaces of the friction disc, for example in cooling channels or end surfaces, which are not accessible for simple visual examination, complete disintegration of the sensor body may be taken as an indication of wear. The sensor is then constructed in such a way that complete disintegration of the material thereof produces non-uniform mass distribution within the friction disc, which is made apparent by imbalance, reduced running smoothness or vibrations. The lack of volume elements due to complete disintegration of a sensor body may also be made apparent by a change in driving or braking noise.

In accordance with a further feature of the invention, the incorporation of such sensors is performed in a cost-effective process stage during manufacture of the friction disc from fiber-reinforced ceramic composite material or C/SiC.

In accordance with an added feature of the invention, the materials which are preferred for the material A for the friction disc and the supporting disc are C/SiC materials produced in particular by liquid infiltration with silicon of carbon-containing material and subsequent reaction with the silicon, although other fiber-reinforced ceramic materials are also suitable.

In accordance with an additional feature of the invention, in the preferred instance, in which C/SiC materials are used for the friction disc, the sensors may be introduced as preliminary bodies into the friction disc prior to siliconization and then subjected to the siliconization stage together with the friction disc. Carbon materials of varying degrees of order and provenance are used as the material for the preliminary sensor bodies. Preferred carbon materials are graphites, in particular fine-grain graphite, graphite products, C fibers in the form of wovens, braided materials, non-woven materials or mats, CFC material, carbonized woods and coal. Graphites, C fiber mats and CFC materials are particularly preferred. The preliminary sensor bodies may also contain oxides, nitrides, silicides and carbides, which have a favorable effect on the reactivity of the carbon materials with regard to fused silicon infiltration and application-determined oxidation. Boron nitride and aluminum oxide are particularly preferred. The composition of the preliminary bodies is adjusted in such a way that the material B of the sensors preferably has a carbon content (mass fraction), after infiltration and reaction, of over 40%, preferably over 60% and particularly preferably over 90%.

With the objects of the invention in view, there is also provided a process for producing a friction disc of C/SiC, which comprises inserting or adhering preliminary bodies for the sensors into recesses (indentations) provided therefor in a preliminary carbon fiber-reinforced carbon-containing body or a preformed CFC friction disc preform prior to silicon infiltration and subsequent reaction. The reaction is referred to as "siliconization" for the sake of simplicity. Mixtures which are formed in particular of carbon materials and pyrolyzable binders, that have been subjected to siliconization, are used as the adhesive. In principle, however, any other adhesives suitable for bonding ceramics may be used, provided that their adhesive action is not lost during siliconization. The material is then infiltrated with liquid silicon, wherein the C/SiC material forms and the sensor elements are firmly connected with the friction disc. The carbon material of the sensors is partially subjected to siliconization at the same time and partially converted into SiC. The wear and oxidation behavior of the sensors is also modified in this way.

An intrinsic feature of the invention is therefore the selection of a suitable composition for the preliminary sensor bodies, in such a way that, after siliconization, the wear and oxidation resistance of the sensor that is reduced appropriately in accordance with the purpose of the friction disc is established. With regard to the geometric execution of the sensors, in principle only the function of the friction surface and the supporting zone together with the desired indicator mechanism have to be taken into account as restricting factors. If a sensor with purely visual indication is provided for performing visual examinations, it should be accommodated on the friction surface of the friction disc. The friction surface is understood to mean the entire top and bottom surfaces of the (cylindrical) friction disc, not only the surface facing the other friction component. Positioning of the planar sensors according to the invention is not therefore limited to the zone of the friction surface exposed to friction. According to the invention, the surface of the sensors may be large enough and formed in such a way that the frictional action of the friction surface is only marginally impaired. Conventionally, the surface area of a surface element acting as a sensor is greater than 0.1%, preferably greater than 1% and particularly preferably 2 to 20% of the surface area of the friction surface. It is also possible to use a plurality of similar or different sensor elements, wherein the entire sensor surface is increased accordingly. The sensor surface may have virtually any structure, with it merely needing to be ensured that sufficiently large surface regions are obtained for visual examination to be possible. The sensors are frequently circular or square or trapezoidal. They may preferably also be in the form of letters and pictograms. The thickness of the sensor elements is substantially determined by the function of the supporting zone. If the strength distribution of the supporting zone allows it, the sensor may also extend from one surface of the friction disc to the other through the supporting zone. According to the invention, a rod-shaped sensor is used for this purpose, rather than a planar one. The thickness of the planar sensors is conventionally below 100% of the thickness of the friction disc, preferably below 51% and particularly preferably below 10%. In the case of friction discs with a friction layer, the thickness of the sensor is conventionally 0.1 to 10 times the thickness of the friction layer, and preferably approximately of equal thickness. In a further embodiment, a rod-shaped variant is used in which the sensor passes from one surface of the friction disc to the other. The length of the rod-shaped sensor conventionally amounts to 80 to 100% of the thickness of the friction disc, preferably 90 to 100% and particularly preferably approximately 100%. In each case, abrasion of the sensor surface results in at least a visual indication.

In accordance with yet another feature of the invention, the sensors are inserted into the finished, recessed friction disc and fastened therein, for example by adhesively bonding or soldering. If C/SiC is used as the material for the friction disc, adhesion in place in the surface is performed only after completion of the C/SiC friction disc, that is to say after liquid siliconization. The same material as described above is used in this case for the sensors, and the sensor element (material B) in this case preferably likewise represents a mass fraction of carbon of at least 40%. In comparison with the variant involving siliconization of the sensors together with the preliminary friction disc bodies, this has the advantage that the strength of the adhesive bond may be easily conformed to the requirements of the sensor action. Mixtures are used as the adhesive which is formed in particular of carbon materials and pyrolyzable binders. In principle, however, any other adhesive suitable for adhesively bonding ceramics may also be used. In a particularly advantageous embodiment of the invention, the adhesive bond is made so weak that the sensor falls partially or entirely out of its anchorage point at the friction disc running performance to be indicated. In this way, the visual indicator effect is accompanied by a mechanical effect. If the sensor has a suitable size and is suitably positioned, an imbalance is produced when the sensor breaks out, which leads to vibrations in the event of application-appropriate use of the friction disc. The surface of the sensors should only be of such size that the frictional action of the friction surface is only marginally impaired. The surface area of the sensor is conventionally in this case also greater than 0.1%, preferably 1 to 5%, and particularly preferably 2 to 15%, of the surface area of the friction surface. The thickness of the sensors in this case too may also range from a few percent of the thickness of the friction disc, for example 2%, to up to 100% of the thickness of the friction disc. The thickness of the planar sensors in this embodiment is conventionally below 100% of the thickness of the friction disc, preferably below 51% and particularly preferably below 10%. In a further embodiment, a rod-shaped variant may also be used in this case, in which the sensor passes through from one surface of the friction disc to the other. The length of the rod-shaped sensor likewise amounts conventionally to 80 to 100% of the thickness of the friction disc, preferably 90 to 100% and particularly preferably approximately 100%. This embodiment of the invention is naturally not limited to C/SiC materials, but rather allows a combination of any pair of materials A for the friction surface (and supporting zone) and materials B for the sensor body, provided that the condition is fulfilled of having lower oxidative or abrasion resistance for the material B of the sensor elements than for the material A of the friction surface or the supporting zone.

The concept of the invention also embraces embodiments in which the planar sensors are located at the end surface or even on the inner surface of internally ventilated discs. All that is necessary in this case is that air has unhindered access to initiate oxidative wear, so that the sensor may perform its indicating action. In the case of attachment of the sensor to the end surface of the disc or inside the internally ventilated disc, the visual action of the sensor is less important. Thus, an additional indicator mechanism, the volume and geometry of the sensor, may be selected in such a way that the wear of the sensor is indicated audibly or mechanically. This is achieved, for example, by the sensor burning out not merely superficially but completely or partially and imbalance or vibrations being generated by the modified volume or mass distribution within the friction disc during operation, or unevenly by friction behavior so that "rubbing", arising. These phenomena may then be used as the sensor's indicator action.

For this purpose, the sensor elements are advantageously attached to the friction disc in such a way that, in the case of the loss of 50% of the mass of the sensors due to wear or oxidation, the (static) imbalance arising impairs the balance quality of the system in which the friction disc is incorporated to such a degree that it may be recognized by the user through a change in driving behavior. This may be ensured by appropriate offsetting of the sensor element relative to the axis of rotation or by the installation of a plurality of sensor elements. The balance quality is defined, as conventionally, by the product of the angular velocity of the rotating friction disc and its static imbalance, divided by the mass of the friction disc. When fixing the masses, it is important to ensure that, in the event of the loss of 100% of the mass of the sensors, the imbalance arising does not influence the ability of the system to function.

The mass of a sensor element conventionally is at least within the range of from approximately 10 to 12 g for a friction disc mass of approximately 3 kg, i.e. at least approximately 0.3% of the friction disc mass.

Other features which are considered as characteristic for the invention are set forth in the appended claims.

Although the invention is illustrated and described herein as embodied in a friction disc and a process for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, sectional view of a friction disc with different sensor elements;

FIG. 2 is a plan view of a friction disc with different discrete sensor element embodiments; and FIG. 3 is a plan view of a friction disc with an elliptical sensor element.

DESCRIPTION OF THE PREFERRED EMBODIMENTS

Referring now to the figures of the drawings in detail and first, particularly, to FIG. 1 thereof, there is seen a section through a friction disc 1 having a surface in which are introduced various sensor elements 2a and 2b or rod-shaped sensors 2c, 2d and 2e, which may be parallel or inclined to an axis of rotation of the friction disc and which extend through an entire thickness of the friction disc. An upper zone which is exposed to wear is a friction surface whereas material below the friction surface forms a supporting zone. The friction surface and the supporting zone are formed of a material A, whereas the sensor elements are formed of a material B being different than the material A and exhibiting lower wear and oxidation resistance than the material A. The sensor element 2e passes through a channel of an internally ventilated brake disc. Both sensor element structures may be introduced in both described manners, on one hand by embedding a preliminary sensor body into a carbon-containing ceramic material and subsequently joint infiltration thereof with liquid silicon or, on the other hand, by adhesion of a sensor body in position in the (e.g. ready siliconized C/SiC) friction disc.

FIG. 2 shows a friction disc 1 in a plan view with differently shaped sensors 2e to 2h and with an embodiment of a sensor element in the form of text 2i. It is evident that care must be taken to ensure, in a practical embodiment, that marking zones for a plurality of sensors are disposed in rotation symmetrically about the axis (at least a two-fold axis of symmetry as an axis of rotation). Sensor surface element configurations are preferred which exhibit a two-fold, three-fold, four-fold or six-fold axis of symmetry relative to the axis of rotation of the friction disc.

FIG. 3 shows a friction disc 1 in a plan view with an elliptical sensor element 2j.

A sensor with such a large area (in the case of the sensors 2h and 2j) may only be installed in the surface. A one-piece manufacture of the friction disc would otherwise be impossible in the instances shown. The types of sensors 2a to 2g and 2i may be installed in the surface and in such a way as to pass through the friction disc (in a rod-form).

For example, in a structure with four sensor elements initially having the same mass, each two adjacent sensor elements are made from the same one material and the opposing pair from a second material. The two different sensor materials display different oxidation or wear sensitivities, so that an imbalance is additionally produced when they wear due to different rates of disintegration, which is evident, in particular, during fast driving.

The invention will be explained in more detail by the following Examples:

EXAMPLE 1

In order to produce a brake disc with a visual wear indicator, a porous CFC body was produced in the form of a brake disc with an external diameter of 350 mm. An indentation for accommodating a planar sensor element had already been provided in this brake disc body in accordance with the sensor element 2e. Such an indentation was located in the middle of the opposite area from the brake lining on the subsequently exterior side of the brake disc. The dimensions of the round indentation were a diameter of 20 mm and a depth of 4 mm. A graphitized CFC element with a density of 1.09 g/cm³ was fitted into the indentation. The brake disc was then placed in a furnace, covered with silicon pellets and heated to 1600 to 1900° C. after evacuation of the furnace chamber. As a result, the silicon infiltrated the body and firmly bonded the sensor to the brake disc.

The difference in oxidation rate was such that the sensor element displayed a weight loss of approximately 65% within an hour at a reference temperature of 800° C. This rate was easily and clearly detected from the rough and porous structure.

In contrast thereto, the oxidative weight loss of the reference brake disc without the sensor element was approximately 12% under the same conditions. The surface was markedly smoother and denser than that of the sensor element.

EXAMPLE 2

In order to produce a brake disc with a visual wear indicator, a porous CFC body was produced in the form of a brake disc with an external diameter of 350 mm. Two indentations for accommodating a planar sensor element had already been provided in this brake disc body in accordance with the sensor 2f. These indentations were located on mutually opposing surfaces of the brake disc outside the zone opposite the friction lining. The external dimensions of the indentation were a diameter of 20 mm and a depth of 4 mm. The brake disc body was subjected to siliconization as described in Example 1.

A graphite element having a density of 1.75 g/cm³ was adhesively bonded in position in the indentation.

EXAMPLE 3

In order to produce a brake disc with a mechanically operated wear indicator according to FIG. 1, a porous CFC body was produced in the form of a brake disc with an external diameter of 350 mm. The brake disc had channels for internal ventilation. A graphite pin was inserted perpendicularly through the brake disc body (in accordance with the sensor 2e in FIG. 2), in such a way that it extended from one surface of the friction disc to the other and passed through an internal ventilation channel. The graphite pin had a diameter of 5.5 mm. The graphite pin was secured in the bores with a phenolic resin adhesive. The brake disc was then subjected to siliconization as described in Example 1.

The difference in oxidation rates at a reference temperature of 800° C. was such that the pin became detached from its anchorage point due to burn-off after approximately 1 hour and fell out of the bore. Thus, an imbalance was produced in the previously balanced disc, which became apparent to the driver through vibrations. However, the burned-off state of the graphite pin could also be easily determined visually after only approximately 30 minutes.

We claim:

1. A friction disc, comprising:
   at least one top surface formed as a friction surface;
   a supporting zone;
   a carbon fiber-reinforced ceramic composite material A;
   a material B being different than said material A and exhibiting lower wear and oxidation resistance than said material A;
   at least a part of saki friction surface being elements with a given mass formed of said material B, and a remainder of said friction surface and said supporting zone being formed of said material A; and
   a balance quality being impaired by at least 5% due to a friction disc imbalance caused by a loss of 50% of said given mess.

2. The friction disc according to claim 1, wherein the friction disc is a brake disc.

3. The friction disc according to claim 1, wherein the friction disc is a clutch disc.

4. The friction disc according to claim 1, wherein said material B is a carbon-containing material.

5. The friction disc according to claim 1, wherein said carbon fiber-reinforced ceramic material A of said supporting zone and said friction surface has a matrix containing silicon carbide, silicon and carbon.

6. The friction disc according to claim 5, wherein said material A of said supporting zone and said friction surface is obtained by infiltration of a carbon fiber-reinforced carbon body with liquid silicon and reaction of the silicon with at least part of the carbon of said matrix to yield silicon carbide.

7. The friction disc according to claim 1, wherein said material B has a carbon mass fraction over 40%.

8. The friction disc according to claim 1, which further comprises a friction disc thickness, at least one of said elements formed of said material B extending entirely over said friction disc thickness.

9. The friction disc according to claim 1, wherein said elements formed of said material B are disposed rotationally symmetrically.

10. The friction disc according to claim 1, wherein said material B contains carbon in a form selected from the group consisting of graphite, fine-grain graphite, carbon fiber mats, carbon fiber non-woven materials, carbon fiber-reinforced carbon (CFC) and coal.

11. The friction disc according to claim 10, wherein said material B contains oxides, nitrides, silicides and carbides, as further constituents.

12. The friction disc according to claim 1, wherein said material B contains at least one of boron nitride, silicon carbide and aluminum oxide.

13. The friction disc according to claim 1, which further comprises a bottom surface, said bottom surface and said at least one top surface of the entire friction disk having a surface area, and a proportion of said surface area occupied by said elements formed of said material B amounting to at least 1%.

14. The friction disc according to claim 1, wherein said material B has a mass fraction in the friction disc amounting to at least 0.3%.

15. A process for producing a friction disc, which comprises the steps of:
inserting shaped elements made from said material B into matching recesses formed in said material A of a friction disc according to claim 1; and
securing said elements in said recesses.

16. A process for producing a friction disc according to claim 6, which comprises the steps of:
inserting precursor elements for said elements of said material B in recesses provided for said elements in a carbon fiber-reinforced carbon-containing precursor friction disc body prior to silicon infiltration and siliconization; and
then infiltrating the precursor friction disc body with liquid silicon, to form a C/SiC material and to form and firmly bond said elements of said material B in the friction disc.

17. The process according to claim 16, which further comprises adhesively bonding the precursor elements in the recesses.

18. The process according to claim 16, which further comprises forming the recesses as indentations or bores.

* * * * *

UNITED STATES PATENT AND TRADEMARK OFFICE
CERTIFICATE OF CORRECTION

| | | |
|---|---|---|
| PATENT NO. | : 7,219,776 B2 | Page 1 of 1 |
| APPLICATION NO. | : 10/125083 | |
| DATED | : May 22, 2007 | |
| INVENTOR(S) | : Moritz Bauer et al. | |

It is certified that error appears in the above-identified patent and that said Letters Patent is hereby corrected as shown below:

<u>Claim 1,</u>

Line 61, "saki" should read -- said--

Line 67, "mess" should read --mass--

Signed and Sealed this

Twenty-fourth Day of July, 2007

JON W. DUDAS
*Director of the United States Patent and Trademark Office*